United States Patent [19]

Handke et al.

[11] Patent Number: 5,131,263
[45] Date of Patent: Jul. 21, 1992

[54] DEVICE AND A METHOD FOR DETECTING LEAKS

[75] Inventors: Klaus Handke; Heinz D. Bürger; Falk Braunschweig, all of Wertheim, Fed. Rep. of Germany

[73] Assignee: Alcatel Hochvakuumtechnik GmbH, Fed. Rep. of Germany

[21] Appl. No.: 626,154

[22] Filed: Dec. 12, 1990

[30] Foreign Application Priority Data

Dec. 15, 1989 [EP] European Pat. Off. ........ 89123205.5

[51] Int. Cl.$^5$ .............................................. G01M 3/20
[52] U.S. Cl. ............................................................ 73/40.7
[58] Field of Search ............................................. 73/40.7

[56] References Cited

U.S. PATENT DOCUMENTS

| 3,824,839 | 7/1974 | Briggs | 73/40.7 |
| 4,919,599 | 4/1990 | Reich et al. | 73/40.7 X |
| 4,983,828 | 1/1991 | Bürger | 73/40.7 X |
| 4,984,450 | 1/1991 | Bürger | 73/40.7 |

FOREIGN PATENT DOCUMENTS 2137071 12/1972 France .
2366553 4/1978 France .

Primary Examiner—Hezron E. Williams
Assistant Examiner—Joseph W. Roskos
Attorney, Agent, or Firm—Sughrue, Mion, Zinn, Macpeak & Seas

[57] ABSTRACT

A device detects leaks in a test object (1), which is contained in a test container (2). The device includes a mass spectrometer (14) detecting a noble gas such as helium, and a pump arrangement containing a primary vacuum pump (13) and a spiromolecular pump (11). The noble gas atoms flow through the latter in opposition to the pump direction towards the mass spectrometer. Between the test container (2) and an outlet port (10) of the spiromolecular pump (11), an accumulation chamber (8) is inserted, whose volume is considerably larger than that of the test container (2). The test container is provided with a source of purge gas (3) and a valve (4) for purging the test container with a purge gas under an adjustable overpressure. Closure valve (7) is disposed between the test container (2) and the accumulation chamber (8) and a closure valve (9) between the accumulation chamber (8) and the outlet port (10) of the spiromolecular pump (11).

9 Claims, 2 Drawing Sheets

DEVICE AND A METHOD FOR DETECTING
LEAKS

The invention relates to a device and a method for detecting leaks in a test object which is situated in a test container, by means of a mass spectrometer detecting a noble gas such as helium and a pump arrangement containing a primary vacuum pump and a spiromolecular pump, the noble gas atoms flowing through the latter in opposition to the pump direction towards the mass spectrometer.

BACKGROUND OF THE INVENTION

The field of the invention extends in particular, but not exclusively, to the detection of leaks in small housings, for example housings for semiconductor components or watches.

From U.S. Pat. No. 4,608,866, a device for such application is known, wherein, during the insertion of the test objects, a test container is exposed to a purge gas atmosphere with approximately atmospheric pressure. After closing the test container, a valve is opened in the direction of a low temperature trap, so that the purge gas is evacuated before a valve is opened in the direction of a mass spectrometer and of a molecular pump arrangement associated therewith.

This device is complicated and expensive since it necessitates a very effective low temperature trap absorbing effectively all the purge carrier gas from the test container, so that no inadmissibly high total pressure can reach the mass spectrometer. The temperature of the low temperature trap is indicated with 16 to 22K.

If a primary pump were connected to the test container instead of the low temperature trap, so as to bring the container, after its closing, to a pressure convenient for the mass spectrometer prior to establishing the connection therewith, this would create the risk that already during this primary pumping phase, if the leak is large enough, also the inside of a test object would be evacuated to such an extent that lateron, i.e. during the actual measuring phase, no more helium atoms would be detected.

It is thus the aim of the invention to provide a simple device and a corresponding method of the kind indicated above, in which a high performance low temperature trap necessitating liquid helium or a refrigerator cryopump is not needed.

SUMMARY OF THE INVENTION

According to the invention, this aim is attained by a device for detecting leaks in a test object, which is contained in a test container, by means of a mass spectrometer detecting a noble gas such as helium and a pump arrangement containing a primary vacuum pump and a spiromolecular pump, the noble gas atoms flowing through the latter in opposition to the pump direction towards the mass spectrometer, wherein between the test container and a port of the spiromolecular pump, an accumulation chamber is inserted, whose volume is considerably larger than that of the test container, and the test container is provided with means for purging the test container with a purge gas under an adjustable overpressure, and closure valves are disposed between the test container and the accumulation chamber as well as between the accumulation chamber and said port of the spiromolecular pump.

BRIEF DESCRIPTION OF THE DRAWINGS

The invention will now be described more in detail by means of some preferred embodiments.

DETAILED DESCRIPTION OF THE INVENTION

Figure 1:
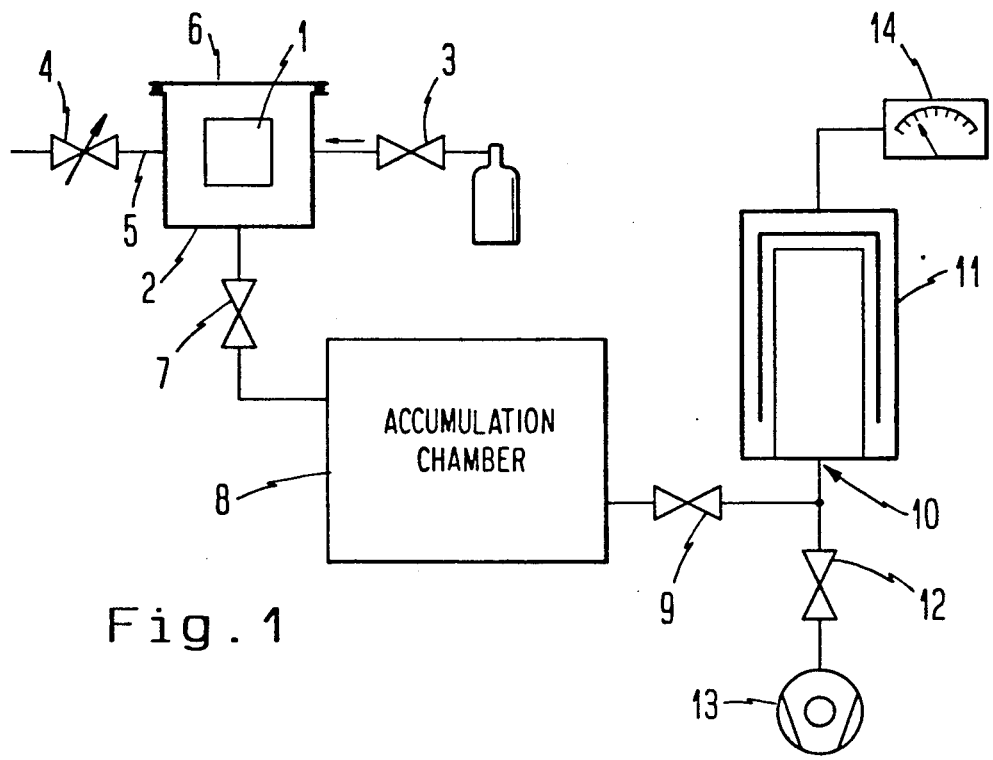
FIG. 1 shows schematically a first embodiment of a device according to the invention.

FIG. 1 shows schematically a device for leak detection. At least one object 1 to be tested is disposed in a test container 2, in which ends a purge gas duct via a valve 3, and which possesses a purge carrier gas outlet 5 provided with a control valve 4. The container is tightly closed with a lid 6 after introduction of the test object(s).

The test container 2 is further connected via a closure valve 7 with an accumulation chamber 8, the volume of which is distinctly larger than the chosen volume of the container 2 minus the volume of the test objects 1. In a typical application, the volume of the test container (remaining volume) is about 5 cm$^3$, whereas the volume of the accumulation chamber is at least 500 cm$^3$.

Via a further closure value 9, the accumulation chamber is connected to the outlet 10 of a spiromolecular pump 11 and simultaneously via a further closure valve 12 to the suction side of a primary vacuum pump 13. The mass spectrometer cell 14 is located on the suction side of the spiromolecular pump 11, so that the helium atoms coming from the test object have to approach the mass spectrometer against the normal pump direction of the spiromolecular pump 11 (counterflow principle).

A leak detection consists of two steps, namely a test container purge step preparing the measurement and the actual measurement step.

Firstly, after introduction of the test object(s) 1 into the test container at atmospheric pressure, the lid 6 is tightly closed and a purge carrier gas flow is created. The pressure of this helium-free purge gas is regulated by means of the valve 4 in such a way that at the beginning, it lies slightly above the normal inside pressure of the test object and then increases continuously, so that no helium atoms can escape through possible leaks from the test objects into the test container, not even through dyanmic flow effects.

At the same time, the valves 9 and 12 are open, so that the accumulation chamber 8 is evacuated to the suction pressure of the primary vacuum pump.

For the actual measurement step, the valve 12 is closed and immediately thereafter the valve 7 is opened. The gas present in the test container 2 around the test objects expands now into the accumulation chamber and through the latter, helium atoms which escape through possible leaks from the test objects then reach the mass spectrometer through the spiromolecular pump. The signal level of the mass spectrometer indication is thus a measure for possible leaks in the test objects. In this way, also very important leaks, such as for example holes with a diameter of a few millimeters or badly fitting lids in quartz housings or watches or other containers are detected, which would be overlooked if the test container were pre-evacuated prior to the actual measurement.

The task of the accumulation chamber is to reduce the pressure drop at the outlet side of the spiromolecular pump when opening the valve 7. In order to maintain the pressure increase here within admissible limits, the volume of the accumulation chamber must be chosen correspondingly high. If for example a pressure at the outlet 10 of the spiromolecular pump of 50 mbar is not to be exceeded, and if the remaining volume of the test container 2 is about 5 cm$^3$ at atmospheric pressure, then the accumulation chamber must have a volume of at least 100 cm$^3$. If, for a shorter response time of the mass spectrometer, the pressure at the outlet of the spiromolecular pump is to be decreased even further, the volume of the accumulation chamber must be chosen correspondingly higher.

Figure 2:
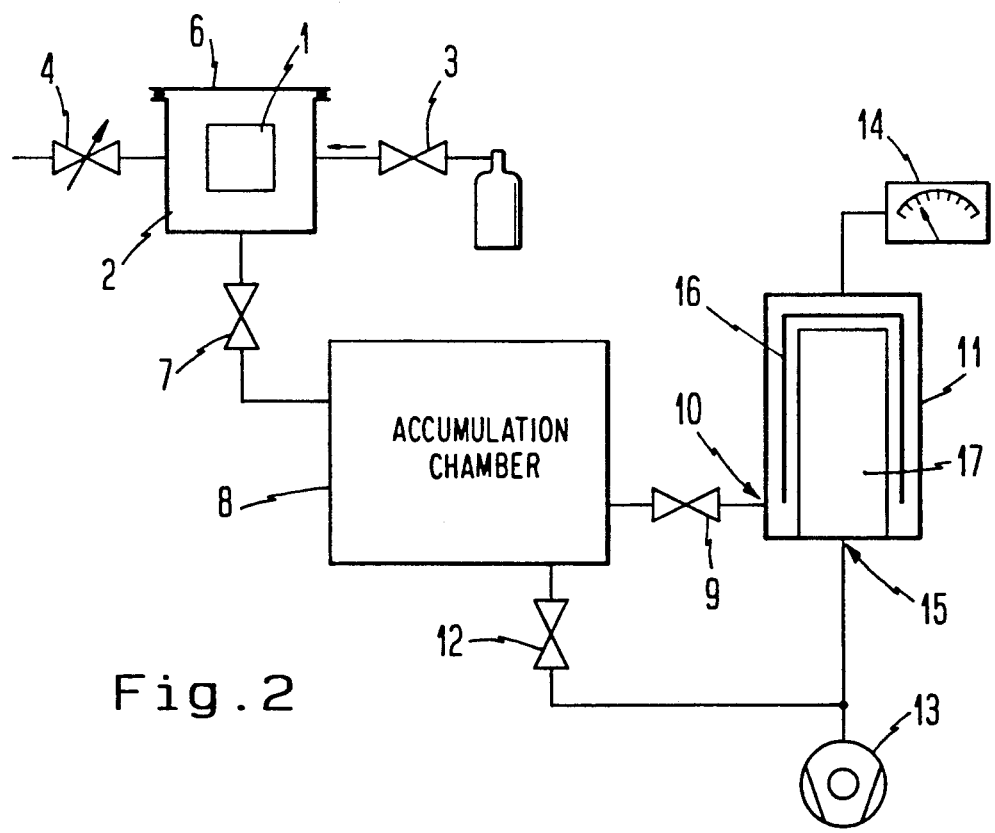
FIG. 2 shows a variant thereto which is distinguished by increased sensitiveness.

FIG. 2 shows a variant to FIG. 1, in which the same reference numerals are used for corresponding parts. The only difference lies in the fact that the spiromolecular pump presents two zones of different suction capacity and the outlet 10 is a port at the transition between these two zones. The spiromolecular pump is a Holweck type pump with a bell-shaped rotor 16, the area between the inside of the bell-shaped rotor and an inner stator 17 having only low suction capacity and thus serving only as a dynamic seal. The outlet 15 of this pump is directly connected to the primary vacuum pump 13, whereas the port 10 leads to the accumulation chamber 8 via the valve 9. In addition, a connection 18 between the primary vacuum pump 13 and the accumulation chamber 8 is provided, which contains the closure valve 12. Via this connection, a rapid evacuation of the accumulation chamber is carried out prior to the actual measurement step.

By connecting the accumulation chamber with the intermediate port 10 the leak detection sensitiveness is decreased, whereas the maximum admissible pressure at the port 10 must be lower than at the outlet 15. This implies again a higher volume of the accumulation chamber.

The measurement time, i.e. the time during which the valves 7 and 9 are open, depends on the desired sensitiveness of the leak detection. Then, in the mass spectrometer, a rising curve of the partial helium pressure is measured, the slope of which is a measure for the size of the leak. Normally, this slop is compared in a computer with a standard curve for leak-free test objects and then evaluated.

If normal air is present in the test objects, i.e. a helium part of 5 ppm, then sensitivenesses up to slightly below $10^{-5}$ mbar l/sec can be obtained with the device according to FIG. 2. If, no the contrary, pure helium is present in the test objects, then the leak detection sensitiveness can be improved to a value below $10^{-12}$ mbar l/sec.

After ending the leak detection step, the valve 12 is opened and the accumulation chamber is again evacuated to primary vacuum pressure (for example $10^{-2}$ mbar) and a low partial helium pressure.

Figure 3:
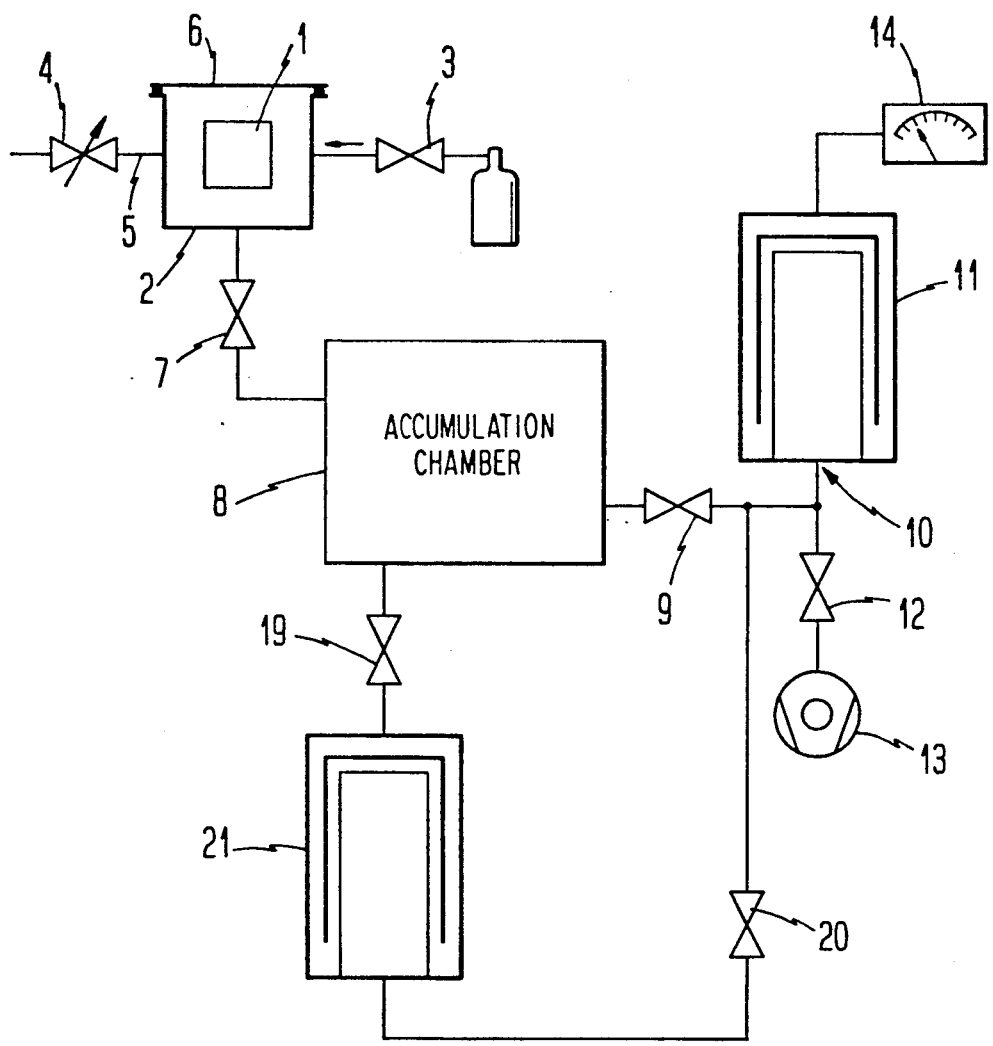
FIG. 3 shows a further variant for test objects which are particularly sensitive to contamination.

FIG. 3 shows a further variant, in which also the same reference numerals are used for the same components. This embodiment differs from the previous ones only in the way in which the accumulation chamber 8 is evacuated prior to the actual measurement. To this effect, via two valves 19 and 20 a further spiromolecular pump 21 is inserted between the accumulation chamber 8 and the primary vacuum pump 13, which is effective during the first step and which has the task to prevent possible hydrocarbons present in the primary vacuum pump from entering the accumulation chamber so as to avoid any contamination of the test objects with these compounds.

It is advantageous to use a three stage rotary vane pump according to DE-36 16 319 C2 as primary vacuum pump, since this securely prevents helium atoms, which do not originate from the test object but from the primary vacuum pump, from falsifying the measurement.

We claim:

1. In a device for detecting leaks in a test object contained in a test container, said device comprising a mass spectrometer detecting a noble gas such as helium, a pump arrangement containing a primary vacuum pump and a spiromolecular pump, the noble gas atoms flowing through said spiromolecular pump in opposition to the pump direction towards the mass spectrometer, the improvement comprising an accumulation chamber between the test container and an outlet port of the spiromolecular pump, said accumulation chamber having a volume which is considerably larger than that of the test container, said test container being provided with means for purging said test container with a purge gas under an adjustable overpressure, and closure valves respectively disposed between the test container and the accumulation chamber and between the accumulation chamber and said outlet port of the spiromolecular pump.

2. A device according to claim 1, wherein a further closure valve is provided between the suction side of the primary vacuum pump and the outlet port of the spiromolecular pump.

3. A device according to claim 1, wherein the spiromolecular pump comprises in series two zones of high and low suction capacity and a second outlet port between these zones, the zone of low suction capacity being disposed on an outlet side of the spiromolecular pump and the accumulation chamber being connected with this connection via a closure valve.

4. A device according to claim 3, wherein a suction side of the primary vacuum pump is connected directly with the outlet of the spiromolecular pump and via a further closure valve with the accumulation chamber.

5. A device according to claim 1, wherein one of a further high vacuum pump, a sorption trap and a low temperature trap is inserted between the accumulation chamber and the outlet port of the spiromolecular pump via closure valves.

6. A device according to claim 1, wherein the primary vacuum pump is a rotary vane pump.

7. A method for the leak detection of a test object using a device for detecting leaks, said test object being contained in a test container, said device comprising a mass spectrometer detecting a noble gas such as helium, a pump arrangement containing a primary vacuum pump and a spiromolecular pump, the noble gas atoms flowing through aid spiromolecular pump in opposition to the pump direction towards the mass spectrometer, an accumulation chamber between the test container and an outlet port of the spiromolecular pump, said accumulation chamber having a volume which is considerably larger than that of the test container, a means for purging said test container with a purge gas under an adjustable overpressure, and closure valves respectively disposed between the test container and the accumulation chamber and between the accumulation chamber and the outlet port of the spiromolecular pump, said method comprising the steps of:

closing the closure valve between the accumulation chamber and the test container, purging the test container at adjustable pressure while simultaneously evacuating the accumulation chamber by the primary vacuum pump, and carrying out a noble gas detection by opening the closure valve between the accumulation chamber and the test container, and simultaneously closing the closure valve between the primary vacuum pump and the outlet port of said spiromolecular pump.

8. A method according to claim 7, wherein the step of detection of the noble gas comprises recording the time function of the noble gas partial pressure and comparing said noble gas partial pressure with a time function of a standard without leak.

9. A method according to claim 7, further comprising setting the purge gas pressure at the beginning of the purge phase to a value higher than the normal inside pressure of the test object and then continuously increasing the purge pressure during purging of the test container.

* * * * *